United States Patent Office 3,623,355
Patented Nov. 30, 1971

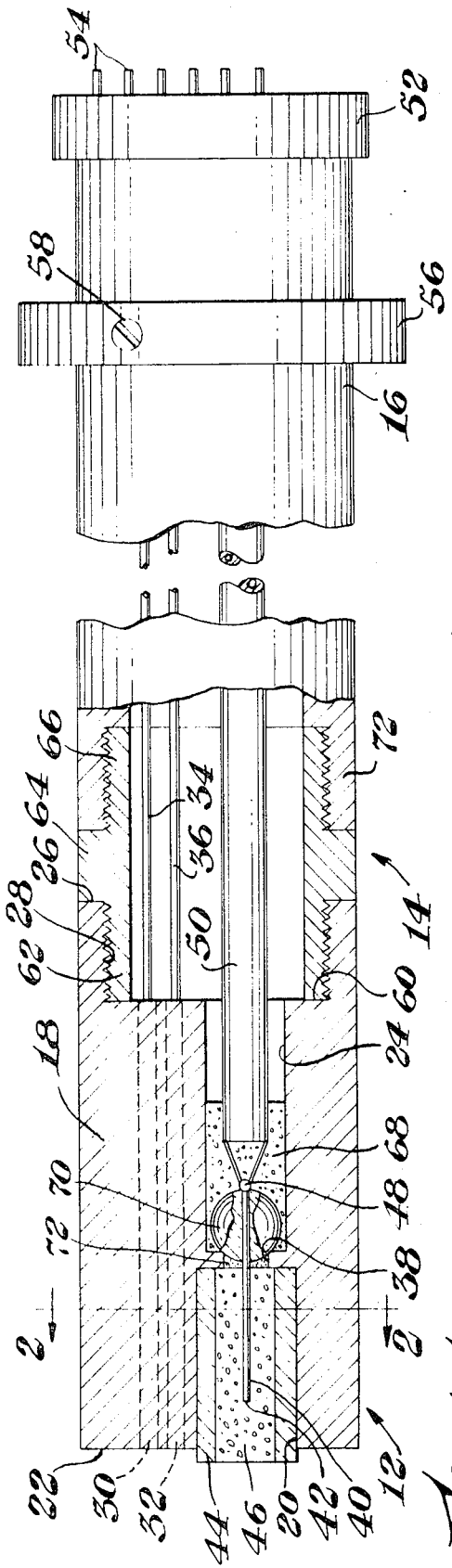
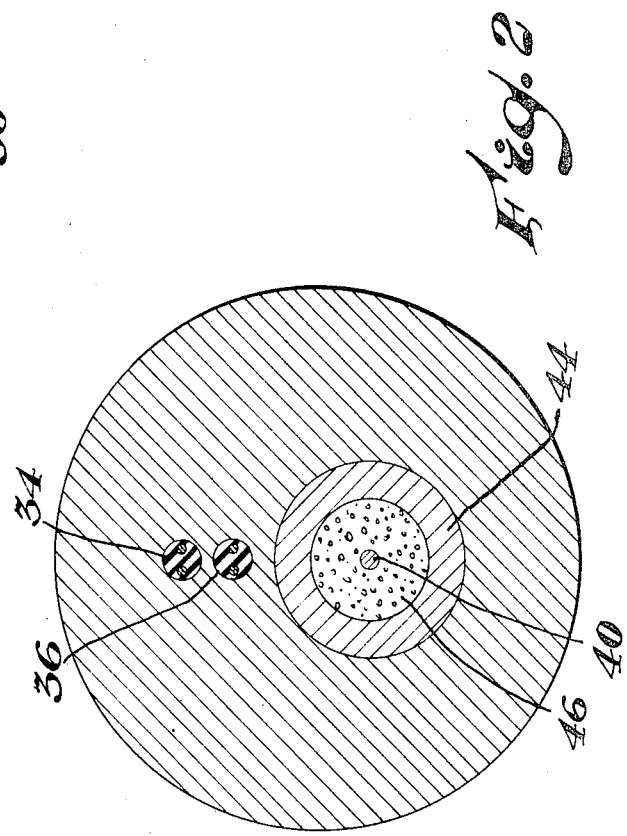

3,623,355
DIFFERENTIAL THERMAL ANALYSIS
CELL ASSEMBLY
Horst G. Langer, Wayland, Mass., assignor to The Dow
Chemical Company, Midland, Mich.
Continuation-in-part of application Ser. No. 840,281,
July 9, 1969. This application Oct. 8, 1969, Ser.
No. 868,272
Int. Cl. G01n 25/00
U.S. Cl. 73—15                                6 Claims

ABSTRACT OF THE DISCLOSURE

This invention relates to a thermal analysis cell which is capable of supplying meaningful data in a high vacuum which is particularly useful for operations within a mass spectrometer or similar instrument which allows the heating of samples within the confinement of the mass spectrometer. The cell comprises a silver block to guarantee uniform heat throughout the cell. It is insulated against the push-through shaft by a section of boron nitride which is an excellent thermal insulator. The sample is loaded into a glass or metal capillary and pushed into a well in the end of the silver block and onto a needle which is coupled to a temperature sensor. Means are provided for developing an electrical signal for reference and cell heating furnace control purposes.

This application is a continuation-in-part of H. G. Langer's copending application Ser. No. 840,281, filed July 9, 1969, for "Differential Thermal Analysis Cell Assembly."

BACKGROUND OF THE INVENTION

This invention relates to differential thermal analysis cells and particulary to differential thermal analysis cells for use in a high vacuum such as exists inside a mass spectrometer, for example.

A thermal analysis cell which is capable of supplying meaningful data in a high vacuum is particularly useful for operations within a mass spectrometer or similar instrument.

However, even though mass spectrometers are sometimes equipped with devices which allow the heating of samples within the confinement of the mass spectrometer vacuum or within the ion source, and such devices sometimes also allow the measurement of sample temperatures during the heating process, these devices do not allow the operation known as differential thermal analysis.

In differential thermal analysis, it is essential that the sample be heated at a predetermined rate of heating, usually a linear rate, that the sample temperature is known and indicated at all times, and for differential thermal analysis operations the sample temperature is continuously compared with that of an inert material in the same cell.

In general, this usually requires that three temperature sensors located in the thermal analysis cell should be precisely at the same temperature at all times unless a chemical reaction occurs in the sample. Thus, it is also of extreme importance that equal heat transfer is guaranteed from the heat source to the thermal analysis cell, that no temperature gradient exists in the cell itself, that fast heat transfer is provided from the cell to the sample and that each thermocouple or other temperature sensor remains electrically insulated.

In addition, to make a cell useful it must be possible to load a sample into the cell and introduce the cell with the sample into a mass spectrometer without shutting down the operation of a mass spectrometer or other evacuated systems.

A principal object of this invention is to provide an improved differential thermal analysis cell assembly.

Another object of this invention is to provide an improved differential thermal analysis cell assembly which is adapted to be used in a high vacuum.

In accordance with this invention, there is provided a cell assembly for insertion in a high vacuum device. The cell itself consists of a block of good thermally conductive metal, such as silver, for example, to facilitate achieving uniform heating of the cell. It is insulated against the push-through shaft by which it is inserted in the mass spectrometer or other high vacuum device by a section of boron nitride or other suitable material which is an excellent thermal insulator. A sample well is disposed in one end of the silver block. The sample is loaded into a glass or metal capillary and pushed into the well and onto a needle which is coupled to a temperature sensing (thermocouple) assembly. This thermocouple assembly consists of a Chromel-Alumel or other thermocouple having a metal needle, usually platinum or silver, welded thereto and extending into the well to protrude well into the sample but without making electrical contact with either the block or any other thermocouple. An insulating ball is slipped over the needle, the ball resting against the thermocouple and against shoulders adjacent to the well. The thermocouple and ball are cemented in place in the silver block. The sample itself provides sufficient electrical insulation to allow even the use of a metal capillary as a sample container. Small sample sizes assure fast and uniform heating of the sample while the silver or platinum needle embedded in the sample guarantees fast response to thermal effects in the sample itself. The block also contains temperature sensing means for determining a reference cell temperature and for providing an electrical signal for use in controlling the heating of the block.

The only efficient way of heat transfer in a vacuum is by radiation, thus the DTA cell itself is surrounded during operation by a radiative furnace.

The invention, as well as additional objects and advantages thereof, will best be understood when the following detailed description is read in connection with the accompanying drawing, in which:

FIG. 1 is a side elevational view, partly broken away and in section, of a differential thermal analysis cell assembly in accordance with this invention;

FIG. 2 is a sectional view taken along the line 2—2 of FIG. 1, and

Figure 3:
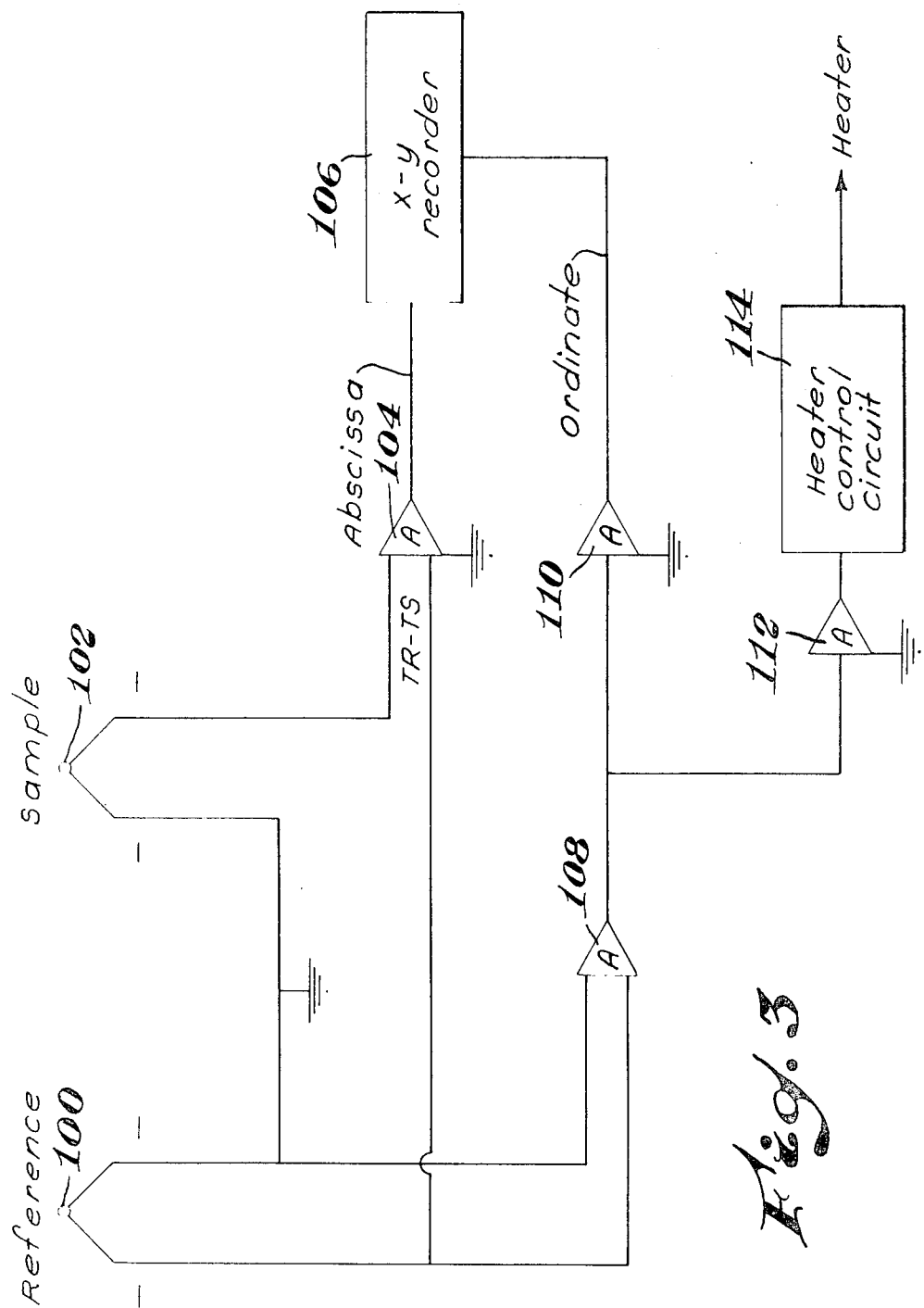
FIG. 3 is a simplified diagram showing alternative means for using a single temperature sensor for reference cell and temperature control purposes.

Referring to the drawing, there is shown a differential thermal analysis cell assembly, indicated generally by the numeral 10.

The assembly 10 comprises a cell, indicated generally by the numeral 12, a thermally insulating coupler 14 and a probe rod part 16.

The cell 12 comprises an elongated cylindrical silver block 18 which contains an axial off-center bore 20 which extends inwardly from the end 22 of the block 18. A bore 24, axially aligned with the bore 20 extends towards the bore 20 from the other end 26 of the block 18. The bores 20, 24 are separated by the shoulder 38 which is formed by drilling a small bore between the bores 20, 24.

The end 26 has a counterbore 60 whose inner wall surface 28 is threaded.

A pair of axial bores 30, 32, equal in size, extend through the block 18 from the end 22 to the end 60. Cables 34, 36 which contain thermocouples at their ends near the end 20 are disposed in the bores 30, 32, respectively.

A larger diameter cable 50 extends into the bore 24 and terminates in a thermocouple 48, usually a Chromel-Alumel thermocouple embedded in ceramic 68. A silver needle-like element 40 is welded to the thermocouple 48 and extends through the space between the shoulder 38 and whose point 42 extends well into the bore 20 defining the sample receiving well.

The silver needle 40 is spaced from the silver block 18 by an electrically insulating ball 70, usually glass which extends from the shoulders 38 to the thermocouple 48.

The electrical and thermally insulating coupling element 14 is conveniently made of boron nitride and is a tubular element having a smooth inner wall, a center part 64 of the same outer diameter as the outer diameter of the block 18, and threaded end parts 62, 66 of reduced diameter which (in the case of end part 62) engage the threaded part 28 of the block 18.

The probe tube 16 has a threaded end 72 which is threadedly coupled to the thread end part 66. The cables 34, 36, and 50 extend through the element 14 and probe tube 16 to the connector 52 which is coupled to the end of the probe tube 16 which is most remote from the silver block 18. The individual wires of the cables are connected to individual terminal pins 54 of the connector 52.

An annular shaped handle and stop member 56 fits over the probe tube 16 and is held in pre-determined position by the set screw 58.

A capillary type tube 44 having particulated sample material 46 disposed therein is inserted by friction fit into the bore 20. The tip 42 of the needle-like part 40 extends through the open part of the tube 44 and well into the sample material.

In operation, the tube 44, as mentioned above, is packed with sample material and inserted in the bore 20 with the tip 42 of the needle-like element 40 extending well into the sample and making physical contact with the sample 46. The element 40 is electrically insulated from the block 18 by cement 72 (usually a ceramic cement) and the ball 70.

The element 14, made of boron nitride, as previously mentioned, thermally isolates the cell tip part 12 from the probe tube 16 (usually made of metal).

The entire assembly 10 is adapted to be inserted into a high vacuum device such as a mass spectrometer, for example through suitable sealable entry means (not shown). A cell probe entry and cell heating means which is especially useful in connection with this and other cell assemblies is disclosed and claimed in Horst G. Langer's copending patent application Ser. No. 840,363, entitled "Furnace Assembly for Thermal Analysis Use," filed July 9, 1969.

While the invention has been described as having three separate temperature sensors (usually thermocouples) for developing signals representing sample and reference temperatures and a furnace control signal, these signals may be derived from two temperature sensors.

Referring to FIG. 3, it may be seen that the output of the reference temperature sensor 100 and sample temperature sensor 102 are coupled to the input of a very high input impedance operational amplifier 104 in a subtractive relationship. The output of the amplifier 104 drives the abscissa of an X-Y type recorder 106.

The reference signal is also coupled to a very high input impedance operational implifier 108 whose output is coupled to the input of very high input impedance amplifiers 110, 112 respectively.

The output of the amplifier 112 is coupled to a heater control circuit which is in turn coupled to the furnace (not shown) used to heat the cell assembly.

The output of amplifier 110 is coupled to the ordinate drive of the X-Y recorder 106.

The very high input impedance of 104, 108, prevents signal interaction which would hinder the use of the reference sensor signal also being used as the furnace control signal (or vice versa). It is assumed that the placement of the second (usually the reference) temperature sensor in the assembly is such that the output signal is suitable as the furnace control signal.

Thus, while it may be convenient to use three temperature sensors in many applications, the alternative shown in simplified form in FIG. 3 may be used.

The assembly 12 is about 8 inches in length in one embodiment which has been tested. The sample holder tube 44 is about 7 mm. in diameter, and may be made of glass or metal such as stainless steel or other metal which is non-reactive with the sample.

It has been found that the device satisfies the desired conditions that three thermocouples located in the thermal analysis cell should be precisely at the same temperature at all times unless a chemical reaction occurs in the sample; that no temperature gradient exists in the cell itself, and that fast heat transfer is provided from the cell to the sample and that each thermocouple remains electrically insulated.

In addition, to make a cell useful it must be possible to load a sample into the cell and introduce the cell with the sample into a mass spectrometer without shutting down the operation of a mass spectrometer or other evacuated systems. This is easily accomplished with cell assemblies in accordance with this invention.

This cell assembly is an improvement over the cell claimed in F. J. Karle et al.'s copending application Ser. No. 742,869, filed July 5, 1968, for "Differential Thermal Analysis Cell Assembly." The needle-like element 40, for example, is welded directly to the thermocouple 48 and is more readily and effectively inserted into the sample 46 than is the more massive spear-like silver member used in the Karle et al. application.

Further, the ball 70 seated against the shoulders 38 provides an effective seal to limit the amount of gas which can permeate towards the rear end of the cell assembly.

What is claimed is:

1. A differential thermal analysis cell assembly for use under high vacuum conditions, comprising a cell section, a thermal isolation section and a hollow probe section, said sections being joined together in the order listed in end to end relationship and having, when so joined, a generally cylindrical configuration with a smooth substantially constant diameter outer surface, said cell section comprising a generally cylindrically shaped block of highly thermally conductive metal having a sample cell receiving bore extending inwardly from one end and a bore axially aligned with said cell receiving bore extending toward said cell receiving bore from the other end of said block of metal, said sample receiving bore being adapted to receive in friction fit relationship a hollow element filled with sample material to be analyzed, said axially aligned bores being joined by a third axially aligned bore of smaller diameter than said axially aligned bores to provide an inwardly extending shoulder between said axially aligned bores, a sample contacting temperature sensor assembly including an elongated needle-like metal member fixedly coupled to the temperature sensor of said assembly and said needle-like member being inserted in said aligned bores with the unattached end of said needle-like member extending well into said sample receiving cell, said needle-like member extending through an insulating element which seats against said shoulder and against said temperature sensor, said insulating element and said temperature sensor being cemented in position in said bore which is aligned with said cell receiving bore, said temperature sensor being coupled to a multi-conductor cable, said cable extending through said cell section, said thermal isolation section and said probe section, said block of highly thermally conductive metal also containing additional temperature sensing means coupled to cable means, said thermal isolation section being rigidly coupled at one end to said cell section and at its other end to said probe section, said probe section having electrical coupling means at its end which is remote from said thermal isolation section, said coupling means being electrically connected to the conductors which are connected to said previously mentioned temperature sensing means.

2. A cell assembly in accordance with claim 1, wherein said additional temperature sensing means comprise a pair of thermocouples disposed in said block.

3. A cell assembly in accordance with claim 2, wherein each of said thermocouples is electrically insulated from the other.

4. A cell assembly in accordance with claim 1 wherein said needle-like member is made of silver.

5. A cell assembly in accordance with claim 1, wherein said insulating element is a vitreous ball having a bore extending therethrough.

6. A cell assembly in accordance with claim 1, wherein said block of highly thermally conductive metal is made of silver.

References Cited

UNITED STATES PATENTS

| | | |
|---|---|---|
| 2,797,575 | 7/1957 | Sand. |
| 3,491,581 | 1/1970 | Roberts et al. |

JAMES J. GILL, Primary Examiner

H. GOLDSTEIN, Assistant Examiner